(12) United States Patent
Hsu (10) Patent No.: US 11,803,412 B2
(45) Date of Patent: Oct. 31, 2023

(54) CONTAINERIZED APPLICATION MANAGEMENT SYSTEM AND MANAGEMENT METHOD

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 445 days.

(21) Appl. No.: 17/240,975

(22) Filed: Apr. 26, 2021

(65) Prior Publication Data

US 2022/0114004 A1 Apr. 14, 2022

Related U.S. Application Data

(60) Provisional application No. 63/090,282, filed on Oct. 12, 2020.

(30) Foreign Application Priority Data

Nov. 30, 2020 (TW) .................................. 109141936

(51) Int. Cl.
*G06F 9/54* (2006.01)
*G06F 9/455* (2018.01)

(52) U.S. Cl.
CPC .......... *G06F 9/45558* (2013.01); *G06F 9/547* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| 10,158,894 B2 * | 12/2018 | Nair .................... H04N 21/2381 |
| 2016/0241676 A1 * | 8/2016 | Armstrong ........ G06F 16/24568 |
| 2019/0065323 A1 | 2/2019 | Dhamdhere et al. |
| 2020/0401915 A1 * | 12/2020 | Tung ....................... G06N 20/00 |

FOREIGN PATENT DOCUMENTS

| CN | 108958976 | 12/2018 |
| CN | 110825495 | 2/2020 |
| CN | 111338854 | 6/2020 |

\* cited by examiner

*Primary Examiner* — Craig C Dorais
(74) *Attorney, Agent, or Firm* — JCIPRNET (57) ABSTRACT

A containerized application management system and management method, applied to a network, are provided. The system includes a master node, a first worker node with a first change tracking program pod deployed thereon, and a second worker node with a second change tracking program pod deployed thereon. The method includes: receiving a pod create request, and sending a content mutate request by the master node when content of the pod create request meets a preset condition; receiving the content mutate request and changing the content to form a mutated pod create request, and forwarding the mutated pod create request by the master node to the first or second worker node; and enabling the first or second worker node to create a pod according to the mutated pod create request. The pod includes an initial container and at least one container.

16 Claims, 4 Drawing Sheets

CONTAINERIZED APPLICATION MANAGEMENT SYSTEM AND MANAGEMENT METHOD

CROSS-REFERENCE TO RELATED APPLICATION

This application claims the priority benefit of U.S. provisional application Ser. No. 63/090,282, filed on Oct. 12, 2020, and Taiwan application serial no. 109141936, filed on Nov. 30, 2020. The entirety of each of the above-mentioned patent applications is hereby incorporated by reference herein and made a part of this specification.

BACKGROUND

Technical Field

The disclosure relates to a containerized application management system and management method, especially a containerized application management system and management method that may be applied to information networks.

Description of Related Art

As information products become more diversified in the recent years, the operating systems and hardware configurations of computer hosts or smartphones of various brands may be different. Therefore, in order for an application be executed on different hosts, virtualization technique is developed. Virtualization technique is to create an environment that enables the application to operate in the same environment. The goal is to package the execution environment required by an application to create an independent environment, so as to facilitate the migrating of the application across different hardware. At present, there are two types of common virtualization technique. The first type is virtualization at the system level, usually referred to as the virtual machine. The second type is virtualization at the operating system level, usually referred to as the container.

The virtual machine is built for the operating system and is virtualized at the system level. The virtual machine may execute a complete operating system, which is a concept of installing a guest operating system on a host operating system. In detail, a software, hypervisor, may virtualize the hardware, such as a central processing unit (CPU) and memory, etc., to create one or more virtual machines, so that the guest operating system may operate as that it is being executed on a physical machine to enable the two operating systems without having conflicts. Based on this, the hypervisor in the host operating system may create the virtual machines respectively installed the different guest operating systems, so that applications may operate normally on a suitable guest operating system. Therefore, even if the application is executed on different hosts, there is no need to know what the host operating system of the hosts is. As long as the correct guest operating system is installed on the host operating system, the application may operate normally on the correct guest operating system of the hosts.

However, the virtual machine technology requires the guest operating system to be installed in advance, which further causes the issues of slow boot speed and larger memory usage. As a result, another type of virtualization technique, the containerized technology, is developed. The containerized technology is built for applications and is virtualized at the operating system level. The container manager may directly package the program code and library required by an application, establish a resource control mechanism to isolate each container, and allocate system resources of the host operating system. Through the setting of the containers, a guest operating system does not need to be additionally installed for the applications but the application still is able to be successfully executed on different platforms. Moreover, since there is no need to additionally install an operating system, the capacity of the hard disk required to establish the containers may be greatly reduced, and the activation speed may be faster without waiting for an excessively long boot time.

In addition, in order to deploy on a large scale and effectively manage the containerized applications, a software system similar to Kubernetes (hereinafter referred to as K8S) is developed, which is a system configured to help the user to deploy of microservice applications. The software system similar to K8S may deploy multiple containers onto a cluster at the same time. When loading or nodes of the cluster changes, automatically scaling may be performed for the containers, and the statuses of multiple containers may be managed and disaster recovery or error recovery may also be provided. For example, if a container for providing a certain service accidentally crashes, K8S will detect and restart the container to ensure that the service continues to be provided.

The recovery point objective (RPO), which represents the backup frequency, is one of the factors that need to be considered when planning the disaster recovery, because the lower the backup frequency, the higher the amount of data that may be lost. For example, assuming that the system is backed up at 8 p.m. after work every day. Unfortunately, a lightning strike occurred at 4 p.m. one day and the power system is damaged, causing the appliance to be impaired. However, the user can only restore the data by the data backed up at 8 p.m. of the previous day, and hence there is the data has not been backed up yet and is lost.

In order to increase the backup frequency to satisfy the recovery point objective without excessively affecting the operation of the system, the concept of incremental backup is introduced, which performs the next backup mainly based on the backup content of the previous point-in-time backup. Based on this, change tracking mechanisms are configured to track the data that has been changed since the previous point-in-time backup. In the K8S system, various persistent storage resources are supplied to pod in K8S clusters mainly through the interaction with the drivers of the container storage interfaces (CSIs) of the storage provisioners or other plugins. The pod is the smallest execution unit in the K8S system.

However, not all of the storage provisioners have implemented the change tracking mechanisms. As a result, changes in some persistent storage resources may not be completely tracked. Therefore, in order to improve the defects of the above conventional measures, one of the main objectives for developing the disclosure is that the change tracking mechanisms may be successfully implemented in the K8S system for incremental backup on all types of persistent storages.

SUMMARY

Accordingly, how to address the issue of data loss without affecting the reading and writing efficiency of the system while completely tracking data changes is one of the main objectives of developing the disclosure.

The embodiment of the disclosure provides a containerized application management system, which is applied to a network and includes a master node, a first worker node, a second worker node, and at least one content mutation server. The master node is in communication with the network, and runs an application programming interface (API) server for receiving a pod create request. When content of the pod create request meets a preset condition, the master node sends a content mutate request. The first worker node is in communication with the network, and a first change tracking program pod is deployed thereon. The second worker node is in communication with the network, and a second change tracking program pod is deployed thereon. The at least one content mutation server is installed in the master node or the first worker node, and is configured to receive the content mutate request and change the content of the pod create request, so as to form a mutated pod create request. The master node forwards the mutated pod create request to the first worker node or the second worker node, and the first worker node or the second worker node creates a pod according to the mutated pod create request. The pod includes an initial (init) container and at least one container. After the init container is first executed to activate the first change tracking program pod or the second change tracking program pod, the container is executed, so that data changes generated when executing the container are recorded by the first change tracking program pod or the second change tracking program pod.

In an embodiment of the disclosure, the content mutation server comprises a webhook server configured to modify the pod create request to form the mutated pod create request. A modified content includes inserting an init container specification into the content of the pod create request to create the init container, wherein the init container is run prior to other containers of the pod.

In an embodiment of the disclosure, the content of the pod create request meeting the preset condition is that the content of the pod create request matches a preconfigured webhook configuration.

In an embodiment of the disclosure, the init container is first executed to send a change tracking request to the first change tracking program pod or the second change tracking program pod, thereby activating a change tracking process in the first change tracking program pod in the first worker node or the second change tracking program pod in the second worker node.

In an embodiment of the disclosure, the change tracking request sent by the init container is a remote procedure call for activating the change tracking process in the first change tracking program pod or the second change tracking program pod.

In an embodiment of the disclosure, when the pod has been deleted, the first change tracking program pod or the second change tracking program pod stops change tracking in response to the pod being deleted.

In an embodiment of the disclosure, the master node, the first worker node, and the second worker node are included in a first cluster, and the first cluster further includes an agent pod. The containerized application management system further includes a second cluster, and the second cluster further includes a backup controller pod. When the backup controller pod of the second cluster receives a backup request, the backup controller pod first communicates with the agent pod to generate a snapshot request. The snapshot request is processed by a change tracking program pod corresponding to the pod. The change tracking program pod creates a snapshot content in response to the snapshot request and stops previous change tracking, and activates new change tracking and correspondingly stores the new change tracking to a new location of a volume in a cluster storage. The backup controller pod retrieves information of a current volume snapshot content and a location of a previous change log from the agent pod, the backup controller pod then creates another pod create request according to the information retrieved from the agent pod, and the another pod create request specifies the volume snapshot content and the volume in the storage cluster to be mounted onto a backup pod to be created. The second cluster, i.e. a Kubernetes cluster, allocates the volume snapshot content and the volume in the storage cluster to the backup pod and starts to run the backup pod.

In an embodiment of the disclosure, when there is the previous change log, the backup pod reads a change log of a persistent volume from an instructed volume location, and writes a changed block/file of a corresponding volume snapshot content into a backup target. Otherwise, the backup pod performs a complete backup of the volume snapshot content.

In an embodiment of the disclosure, the master node, the first worker node, and the second worker node are included in a cluster, and the cluster further includes a backup controller pod. When the backup controller pod receives a backup request, the backup controller pod first communicates with the master node to generate a snapshot request. The snapshot request is processed by a change tracking program pod corresponding to the pod. The change tracking program pod creates a snapshot content in response to the snapshot request and stops previous change tracking, and activates new change tracking and correspondingly stores the new change tracking to a new location of a volume in a cluster storage. The backup controller pod retrieves information of a current volume snapshot content and a location of a previous change log from the master node, the backup controller pod then creates another pod create request according to the information retrieved from the master node, and the another pod create request specifies the volume snapshot content and the volume in the storage cluster to be mounted onto a backup pod to be created. The cluster allocates the volume snapshot content and the volume in the storage cluster to the backup pod and starts to run the backup pod.

In an embodiment of the disclosure, when there is the previous change log, the backup pod reads a change log of a persistent volume from an instructed volume location, and writes a changed block/file of a corresponding volume snapshot content into a backup target. Otherwise, the backup pod performs a complete backup of the volume snapshot content.

From another perspective, the embodiment of the disclosure provides a containerized application management method, which is applied to a network, a master node, a first worker node with a first change tracking program pod deployed thereon, and a second worker node with a second change tracking program pod deployed thereon, and includes the following steps. A pod create request is received, and the master node sends a content mutate request when content of the pod create request meets a preset condition. The content mutate request is received and the content of the pod create request is changed to form a mutated pod create request, and the master node then forwards the mutated pod create request to the first worker node or the second worker node. The first worker node or the second worker node is enabled to create a pod according to the mutated pod create request. The pod includes an init container and at least one container. After the init container is first executed to activate the first change tracking program pod or the second change tracking program pod, the container is executed, so that data changes generated when executing the container are recorded by the first change tracking program pod or the second change tracking program pod.

In an embodiment of the disclosure, the content of the pod create request meeting the preset condition is that the content of the pod create request matches a preconfigured webhook configuration.

In an embodiment of the disclosure, the init container is first executed to send a change tracking request to the first change tracking program pod or the second change tracking program pod, so as to activate a change tracking process in the first change tracking program pod or the second change tracking program pod.

In an embodiment of the disclosure, the master node, the first worker node, and the second worker node are included in a first cluster, and the first cluster further includes an agent pod. A second cluster is independent of the first cluster, and the second cluster further includes a backup controller pod. When the backup controller pod receives a backup request, the backup controller pod first communicates with the agent pod to generate a snapshot request. The snapshot request is processed by the change tracking program pod corresponding to the pod. The change tracking program pod creates a snapshot content in response to the snapshot request and stops previous change tracking, and activates new change tracking and correspondingly stores the new change tracking to a new location of a volume in a cluster storage. The backup controller pod retrieves information of a current volume snapshot content and a location of a previous change log from the agent pod, the backup controller pod then creates another pod create request according to the information retrieved from the agent pod, and the another pod create request specifies the volume snapshot content and the volume in the storage cluster to be mounted onto a backup pod to be created. The second cluster allocates the volume snapshot content and the volume in the storage cluster to the backup pod and starts to run the backup pod. When there is the previous change log, the backup pod reads a change log of a persistent volume from an instructed volume location, and writes a changed block/file of a corresponding volume snapshot content into a backup target. Otherwise, the backup pod performs a complete backup of the volume snapshot content.

In an embodiment of the disclosure, the master node, the first worker node, and the second worker node are included in a cluster, and the cluster further includes a backup controller pod. When the backup controller pod of the cluster receives a backup request, the backup controller pod first communicates with the master node to generate a snapshot request. The snapshot request is processed by the change tracking program pod corresponding to the pod. The change tracking program pod creates a snapshot content in response to the snapshot request and stops previous change tracking, and activates new change tracking and correspondingly stores the new change tracking to a new location of a volume in a cluster storage. The backup controller pod retrieves information of a current volume snapshot content and a location of a previous change log from the master node, the backup controller pod then creates another pod create request according to the information retrieved from the master node, and the request specifies the volume snapshot content and the volume in the storage cluster to be mounted onto a backup pod to be created. The cluster allocates the volume snapshot content and the volume in the storage cluster to the backup pod and starts to run the backup pod. When there is the previous change log, the backup pod reads a change log of a persistent volume from an instructed volume location, and writes a changed block/file of a corresponding volume snapshot content into a backup target. Otherwise, the backup pod performs a complete backup of the volume snapshot content.

In this way, the issue of data loss that cannot be retrieved in the conventional measures may be solved while maintaining the reading and writing efficiency of the system.

DETAILED DESCRIPTION OF DISCLOSED EMBODIMENTS

Some typical embodiments embodying the features and advantages of the disclosure will be described in detail in the following description. It should be understood that the disclosure can have various changes in different aspects, all of which do not depart from the scope of the disclosure, and the description and drawings therein are essentially for illustrative purposes, rather than limiting the disclosure.

Figure 1:
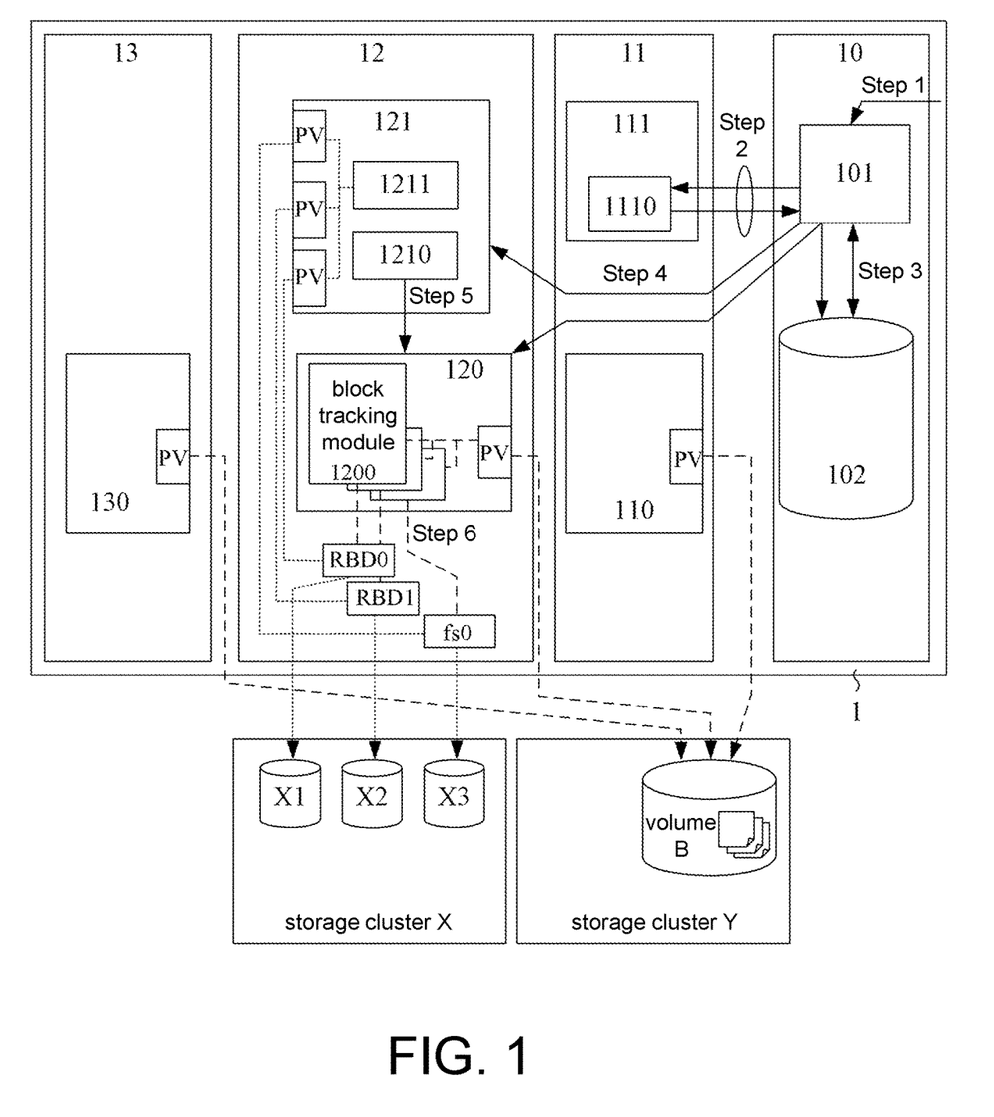
FIG. 1 is a schematic diagram of functional blocks of a management system that may execute a novel containerized application according to an embodiment.

Please refer to FIG. 1, which is a schematic diagram of functional blocks of a management system that may execute a novel containerized application according to an embodiment. The containerized application management system may be applied to a network (such as the Internet or a local area network, not shown in the drawing). Here is an example of Kubernetes (K8S) clusters 1 including four nodes all in communication with the network for description, but the number of nodes is actually not limited thereto. The four nodes in FIG. 1 may be respectively implemented by a master node 10 and three worker nodes 11, 12, and 13. Of course, the architecture is only set up to facilitate illustration, which may also be implemented without limitation if the three worker nodes 11, 12, and 13 are merged into one worker node, or even if the master node and the worker nodes are merged into one single node. The master node 10 runs a K8S application programming interface (API) server 101 and an ETCD database 102. The K8S API server 101 may be configured to receive a pod create request. The ETCD database 102 is a high-availability database, which replicates multiple copies of data into each node of the K8S clusters 1, so the ETCD database 102 may be used to store the data of the entire K8S clusters 1. In this way, if the master node 10 fails for certain reasons, the status of the K8S clusters 1 may be restored through the ETCD database.

In addition, in the embodiment, a first change tracking program pod 110, a second change tracking program pod 120, and a third change tracking program pod 130 are respectively deployed in the first worker node 11, the second worker node 12, and the third worker node 13. The content of the three change tracking program pods may be exactly the same, except that one is executed on each worker node, which is like programs with the same code, but being executed on different computers. Furthermore, in the embodiment, a webhook pod 111 being provided in the first worker node 11 is taken as an example for description. The details of functions of a webhook server 1110 established by the webhook pod 111 will be described in the subsequent description. Certainly, the webhook pod 111 may also be provided in the second worker node 12, the third worker node 13, or the master node 10, all of which may perform the same function. Alternatively, the webhook server may be deployed in each worker node to achieve high availability by means of all being active or all being active-standby.

In the embodiment, a storage cluster X and a storage cluster Y are also provided. The storage cluster X and the storage cluster Y may both be deployed by Ceph clusters. If a secondary group of appliances is deployed to execute the backup operation and store backup data, the storage cluster Y may be constructed from the storage silos of the secondary group. The storage cluster X includes a storage unit X1, a storage unit X2, and a storage unit X3. The storage unit X1 and the storage unit X2 are block devices, also known as RADOS block devices or RBDs for short, provided by Ceph. The RBD0 block and the RBD1 block shown in FIG. 1 are the block devices seen by the operating system of the worker node, which are configured to complete signal connection with the second change tracking program pod 120. The storage unit X3 is a Ceph file system (CephFS) volume. The fs0 block shown in FIG. 1 is a file system seen by the operating system of the worker node, which is configured to correspond to the storage unit X3 and to complete the signal connection with the second change tracking program pod 120. The storage cluster Y may also be provided with a volume B. The volume B may also be a CephFS volume, which may be mounted to all change tracking program pods (such as the first change tracking program pod 110, the second change tracking program pod 120, and the third change tracking program pod 130 in the embodiment). Change logs of each change tracking program pod started from different timepoints may be organized and recorded in the directories of the volume B. The logs of each persistent volume (referred to as PV in FIG. 1) are stored in different subdirectories of the volume B (the directory storage routes are shown by the three dashed lines in the drawing).

Figure 2:
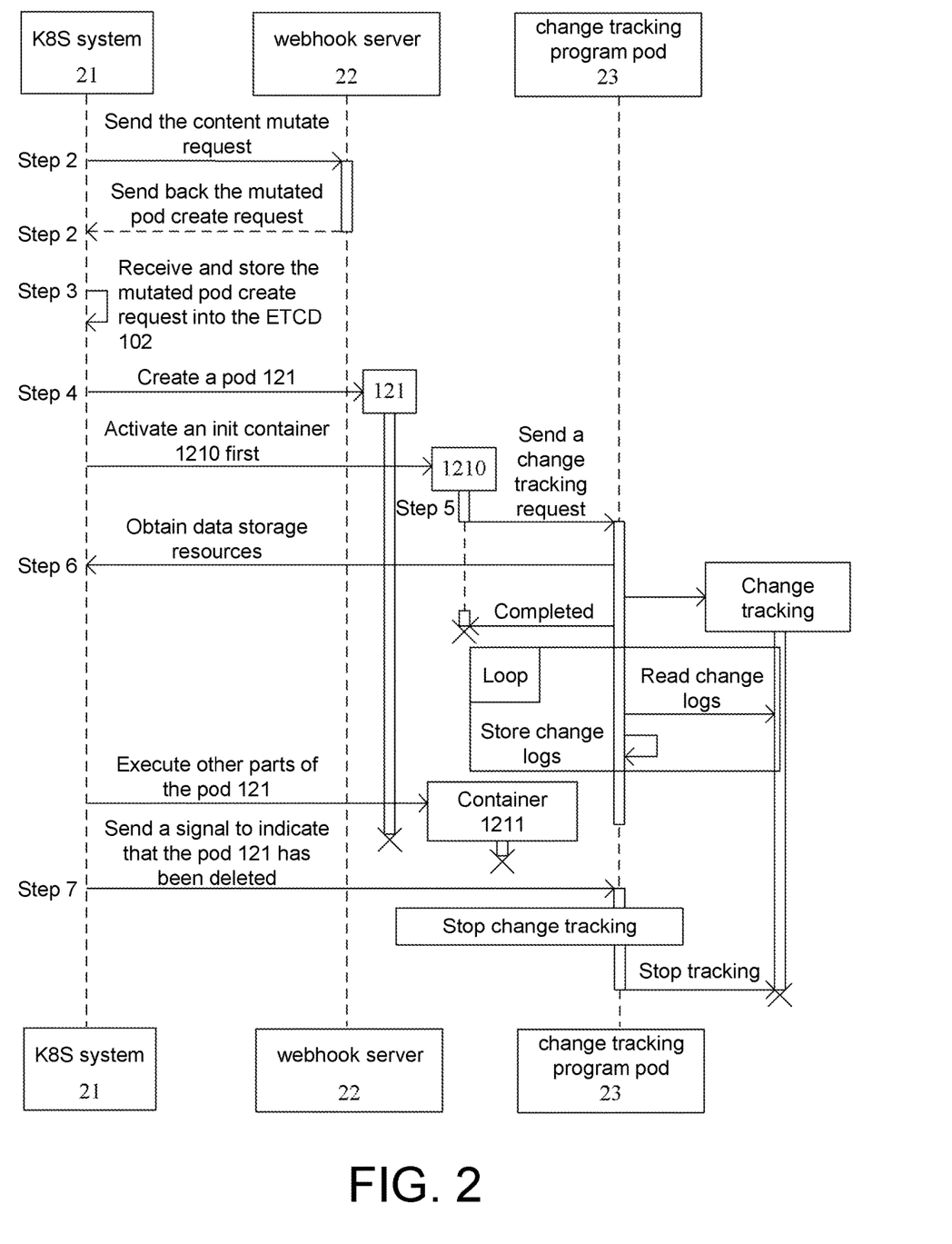
FIG. 2 is a schematic diagram of steps of a method operating on a containerized application management system according to an embodiment.

Please refer to FIG. 2, which is a schematic diagram of steps of a method that may be operated on a containerized application management system according to an embodiment. It may be clearly seen after reading the content of FIG. 1 that the arrow in FIG. 1 representing Step 1 represents that a pod create request is sent to the master node 10. When the K8S API server 101 in the master node 10 receives the pod create request, and content of the pod create request meets a preset condition (for example, the content of the create request matches a preconfigured mutation webhook configuration), the K8S API server 101 in the master node 10 of the K8S system sends a content mutate request. As shown by a K8S system 21 and a content mutation server implemented by a webhook server 22 in FIG. 2, in Step 2, the K8S system 21 sends the content mutate request to the webhook server 22. After receiving the content mutate request, the webhook server 22 patches the content of the pod create request, wherein the patch is mainly to insert an initial (init) container create request into the content of the pod create request, so as to form a mutated pod create request. Then, the mutated pod create request is sent back to the master node 10 representing the K8S system 21.

In Step 3, the master node 10 receives and stores the mutated pod create request to the ETCD 102. In Step 4, the master node 10 sends the mutated pod create request to a certain worker node, so as to create a pod 121 containing an init container 1210 on the certain worker node. The init container 1210 will be activated first. Please refer back to FIG. 1 again. In the embodiment, the pod 121 being created in the second worker node 12 is taken as an example for description. The pod 121 includes the init container 1210 and at least one container 1211. The init container 1210 is executed first and Step 5 is executed to issue a change tracking request, thereby activating a change tracking process in a second change tracking program pod in the second worker node 12. For example, the init container 1210 may send a remote procedure call (RPC) to activate a local change tracking program pod (the second change tracking program pod 120 in the embodiment of FIG. 1) 23, and the name and namespace of the pod 121 are sent as parameters of the RPC.

In Step 6, data storage resources (such as persistent volumes (PVs) of pods) are obtained from the ETCD 102. As shown by the dashed lines in FIG. 1, the block devices or file systems corresponding to the persistent volumes in the operating system may be found, so as to activate change tracking logs. The change tracking logs will be saved to a new directory according to the backup request. The logs in the old directory will be used for query as the basis for incremental backup. Then, after successful termination of the init container 1210, other parts (such as the container 1211 and other containers not shown) of the pod 121 are executed. In this way, the data changes generated when the pod 121 is executed may be recorded by the second change tracking program pod 120 into the successfully allocated data storage resources (such as the PVs) without loss.

In Step 7, when the K8S system 21 sends a signal to the second change tracking program pod 120, it indicates that the pod 121 has been deleted. At this time, the second change tracking program pod 120 stops change tracking due to the pod 121 being deleted. The pod 121 may be scheduled to run on another node due to the failure of the node where the pod 121 resided or other reasons, and the change tracking thereof will be taken care of by a change tracking program pod deployed and activated in another node. Due to the node failure or other reasons, the pod 121 may be scheduled to run on another node, and a change tracking program (i.e. changed block tracking (CBT)) pod already running in the node may track the changes.

The change tracking method of the change tracking program pod may adopt a built-in Linux kernel tracepoint, block trace (blktrace), and other methods. A block tracking module 1200 configured to perform the block tracking method may be built into the change tracking program pod (such as the second change tracking program pod 120 in FIG. 1), so as to explore the basic structure of the Linux kernel tracepoint, thereby tracking a request through the Linux kernel block input/output (I/O) stack. The embodiment of the disclosure may implement a specific block tracepoint driver, so as to record every change of the block devices without losing any records. Moreover, block device tracepoints are utilized in almost all Linux distributions, so that change block tracking may be performed on the K8S system deployed in commonly used Linux distributions.

Figure 3:
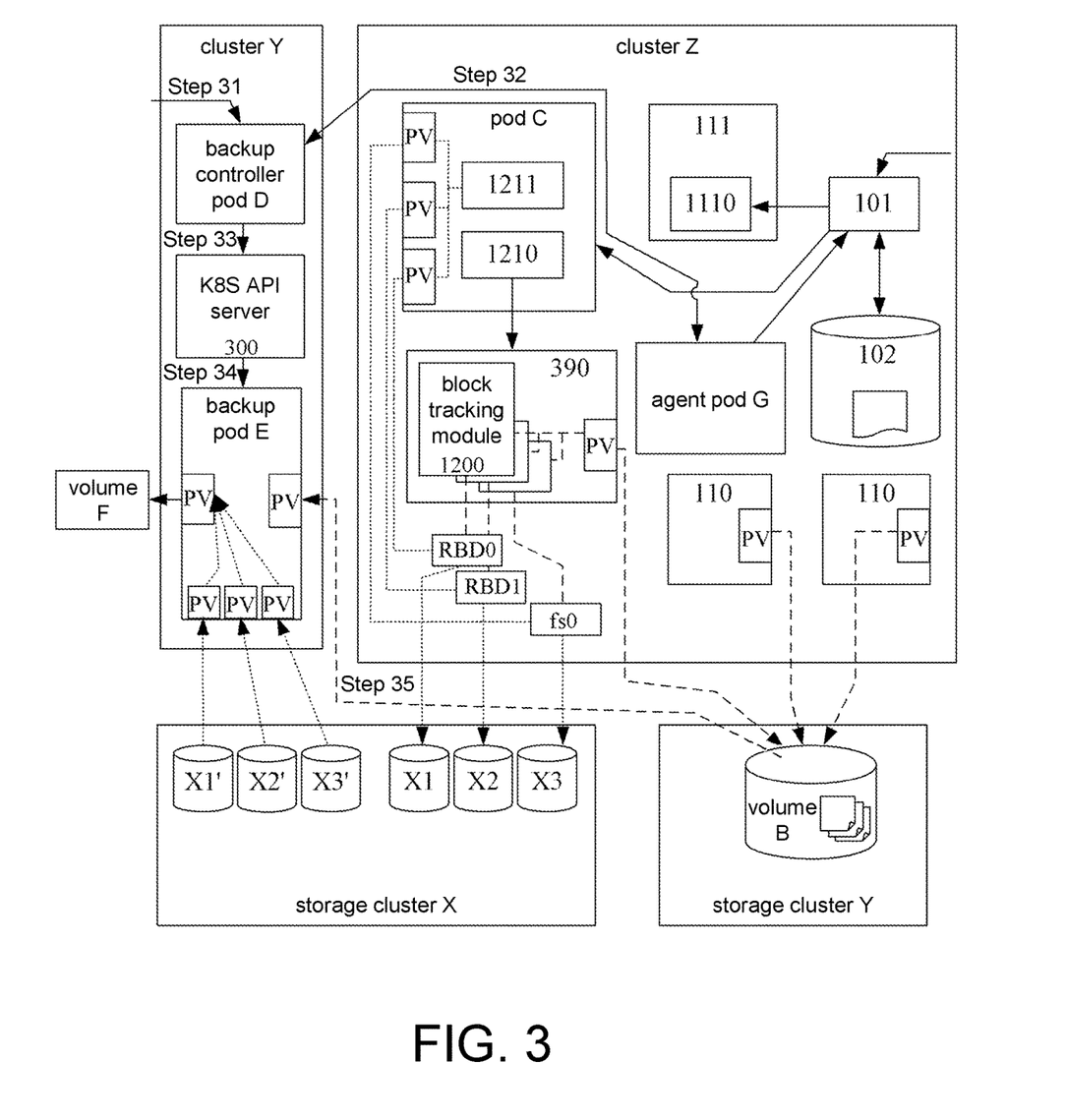
FIG. 3 is a schematic diagram of functional blocks of a management system that may execute a novel containerized application according to another embodiment.

Please refer to FIG. 3, which is a schematic diagram of functional blocks of a management system that may execute a novel containerized application according to another embodiment. The embodiment shown in FIG. 3 is an embodiment of applying the management method onto a secondary cluster. In the embodiment, the secondary cluster may be a secondary hyper-converged infrastructure (hereinafter referred to as HCI) cluster, but is not limited thereto. In FIG. 3, a secondary HCI cluster Y includes a K8S cluster Y and the storage cluster Y. The secondary HCI cluster Y is configured to back up data generated by each pod in a K8S cluster Z. The K8S cluster Z in the embodiment may be regarded as the K8S clusters 1 shown in FIG. 1.

The Ceph file systems corresponding to the storage cluster Y of the K8S cluster Y are provisioned by the container storage interface (CSI) drivers respectively deployed in the K8S cluster Y and the K8S cluster Z. The storage of a pod C is provisioned from the storage cluster X. Xn' (such as X1', X2', and X3') in FIG. 3 represents a snapshot of Xn (such as X1, X2, and X3). A volume F is also provisioned by the Ceph storage cluster X.

A backup controller pod D deployed in the secondary cluster (K8S cluster Y) may retrieve a "VolumeSnapshotContent" resource and specification of a "VolumeSnapshotClass" resource of the snapshot Xn' from the K8S cluster Z through an agent pod G, and execute the following operations to supply Xn' to a backup pod E. First, a volume snapshot class is created in the K8S cluster Y according to volume snapshot class specifications obtained from the K8S cluster Z. Second, the "VolumeSnapshotContent" resource is created based on "VolumeSnapshotContent" information obtained from the K8S cluster Z, and a "VolumeSnapshot" is created for each "VolumeSnapshotContent". Third, a PersistentVolumeClaim resource is created for each Xn' snapshot, and the corresponding volume snapshot name and volume snapshot class name are specified in specifications for creating the PersistentVolumeClaim resource. In addition, change logs are stored to the storage cluster Y, which may reduce the impact on the performance of the storage cluster X, because the storage cluster X has been deployed to provide services for applications in the K8S cluster Z.

Please refer to arrows 31, 32, 33, 34, and 35 shown in FIG. 3, which represent multiple steps of the backup method performed according to the embodiment. The detailed description is as follows. First, Step 31 shown by the arrow 31 explains how to process a backup request. In Step 31 shown by the arrow 31, the backup request is received and processed by the backup controller pod D in the cluster Y that also runs a K8S API server 300. The backup request may be sent by the user or applications outside the cluster. In Step 32 shown by the arrow 32, the backup controller pod D first communicates with the agent pod G in the K8S cluster Z to generate a snapshot request. The snapshot request will be processed by a local change tracking program pod (i.e. CBT pod) 390 corresponding to a pod C. When responding to the snapshot request, the CBT pod 390 will create a snapshot, stop previous change tracking, and activate new change tracking and correspondingly store the new change tracking to a new location of the volume B. Moreover, the backup controller pod D retrieves information of current volume snapshot contents and locations of previous change logs from the agent pod G. In Step 33 shown by the arrow 33, the backup controller pod D creates another pod create request according to the information retrieved from the agent pod G. The another pod create request will mount the volume snapshot contents and the volume B in the storage cluster Y onto a backup pod E to be created. In Step 34 shown by the arrow 34, the K8S cluster Y allocates the volume snapshot contents and the volume B in the storage cluster Y to the backup pod E and starts to run the backup pod E. The content backed up by the backup pod E belongs to the content generated after applications in the pod C run. In Step 35 shown by the arrow 35, judging according to change logs. If there are previous change logs, the backup pod E reads change logs of PV from instructed locations of the volume B, and writes changed blocks/files of corresponding volume snapshot content into a backup target; or otherwise, the backup pod E performs a complete backup of the volume snapshot contents. In other words, if there are no previous change logs, the backup pod E will completely back up the volume snapshot content to another storage volume F. In this way, backup content of first snapshot content will always be a complete backup, and backup of subsequent snapshots will be incremental ones.

Figure 4:
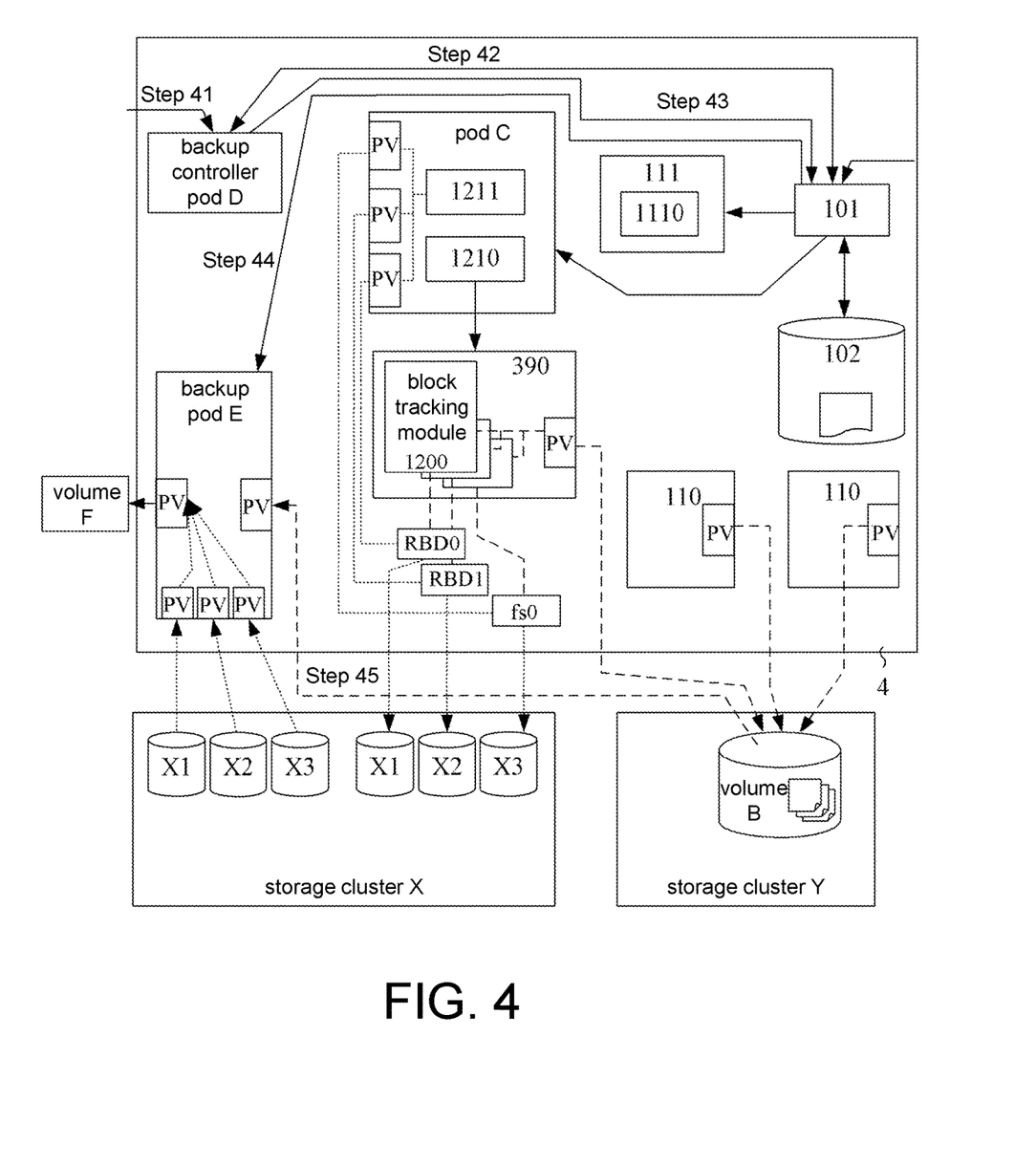
FIG. 4 is a schematic diagram of functional blocks of a management system that may execute a novel containerized application according to yet another embodiment.

Please refer to FIG. 4, which is a schematic diagram of functional blocks of a management system that may execute a novel containerized application according to another embodiment. Similar to FIG. 3, the embodiment shown in FIG. 4 is used to process a backup request, and the more obvious difference is that the backup controller pod D and the pod C are running in the same K8S cluster 4. Arrows 41, 42, 43, 44, and 45 shown in FIG. 4 represent multiple steps of the backup method performed according to the embodiment, which are described in detail as follows.

First, in Step 41 shown by the arrow 41, a backup request is sent from outside the cluster, and the backup request is mainly received and processed by the backup controller pod D running in the same cluster. In Step 42 shown by the arrow 42, the backup controller pod D directly communicates with the K8S API server 101 to generate a snapshot request. The snapshot request will be processed by the local CBT pod 390 corresponding to the pod C. When responding to the snapshot request, the CBT pod 390 will create a snapshot, stop previous change tracking, and activate new change tracking and correspondingly store the new change tracking to a new location of the volume B. Moreover, the backup controller D retrieves information of current volume snapshot contents and locations of previous change logs from the K8S API server 101. In Step 43 shown by the arrow 43, the backup controller D creates another backup pod create request according to the information retrieved from the K8S API server 101. The another pod create request will mount the volume snapshot contents and the volume B in the storage cluster Y onto the backup pod E to be created.

In Step 44 shown by the arrow 44, the K8S cluster 4 allocates the volume snapshot contents and the volume B in the storage cluster Y to the backup pod E and starts to run the backup pod E. In Step 45 shown by the arrow 45, judging according to change logs. If there are previous change logs, the backup pod E reads change logs of PV from instructed locations of the volume B, and writes changed blocks/files of corresponding volume snapshot contents into a backup target; or otherwise, the backup pod E performs a complete backup of the volume snapshot contents. In other words, if there are no previous change logs, the backup pod E will completely back up the volume snapshot contents to another storage volume F. In this way, backup of first snapshot contents will always be a complete backup, and backup of subsequent snapshots will be incremental ones. In addition, the change logs and backup may of course also be stored in different storage clusters other than the storage cluster X.

It should also be noted that, in some embodiments, the containerized application management system may be implemented by one or more computer devices connected to the network. The one or more computer devices may include one or more storage devices and one or more processors. The one or more storage devices store instructions, and the one or more processors may execute the instructions to perform multiple operations of the master node 10, the first worker node 11, the second worker node 12, the third worker node 13, and at least one content mutation server. Moreover, the operations of the programs, modules, and other servers mentioned in the disclosure may also be performed by the one or more processors executing the instructions. The processor may be, for example, a central processing unit (CPU), a graphics processing unit (GPU), an application specific integrated circuits (ASIC), a microprocessor, other similar devices, or a combination thereof. The storage device may be, for example, any type of fixed or removable random access memory (RAM), read-only memory (ROM), flash memory, hard disk, other similar devices, integrated circuits, or a combination thereof.

In summary, the embodiments of the disclosure may successfully implement change tracking mechanisms in the K8S system to perform incremental backups for all types of persistent storage, thereby improving the issue of data loss. However, the disclosure may be modified in many ways by persons skilled in the art, which do not deviate from the protection scope of the appended claims.

What is claimed is:

1. A containerized application management system, applied to a network, comprising:
   one or more processors, configured to perform a plurality of operations of a master node, a first worker node, a second worker node, and at least one content mutation server, wherein
   the master node is in communication with the network, runs an application programming interface (API) server for receiving a pod create request, and sends a content mutate request when content of the pod create request meets a preset condition,
   the first worker node is in communication with the network, and a first change tracking program pod is deployed thereon,
   the second worker node is in communication with the network, and a second change tracking program pod is deployed thereon,
   the at least one content mutation server is installed in the master node or the first worker node, and is configured to receive the content mutate request and change the content of the pod create request, so as to form a mutated pod create request,
   the master node forwards the mutated pod create request to the first worker node or the second worker node, and the first worker node or the second worker node creates a pod according to the mutated pod create request, wherein the pod comprises an initial (init) container and at least one container, and
   after the init container is first executed to activate the first change tracking program pod or the second change tracking program pod, the container is executed, so that data changes generated when executing the container are recorded by the first change tracking program pod or the second change tracking program pod.

2. The containerized application management system according to claim 1, wherein the content mutation server comprises a webhook server configured to modify the pod create request to form the mutated pod create request, wherein a modified content comprises inserting an init container specification into the content of the pod create request to create the init container.

3. The containerized application management system according to claim 1, wherein the content of the pod create request meeting the preset condition is that the content of the pod create request matches a preconfigured webhook configuration.

4. The containerized application management system according to claim 1, wherein the init container is first executed to send a change tracking request to the first change tracking program pod or the second change tracking program pod, thereby activating a change tracking process in the first change tracking program pod in the first worker node or the second change tracking program pod in the second worker node.

5. The containerized application management system according to claim 4, wherein the change tracking request sent by the init container is a remote procedure call for activating the change tracking process in the first change tracking program pod or the second change tracking program pod.

6. The containerized application management system according to claim 1, wherein when the pod has been deleted, the first change tracking program pod or the second change tracking program pod stops change tracking in response to the pod being deleted.

7. The containerized application management system according to claim 1, wherein the master node, the first worker node, and the second worker node are comprised in a first cluster, the first cluster further comprises an agent pod, the containerized application management system further comprises a second cluster, the second cluster further comprises a backup controller pod, and when the backup controller pod of the second cluster receives a backup request, the backup controller pod first communicates with the agent pod to generate a snapshot request, and the snapshot request is processed by a change tracking program pod corresponding to the pod, wherein
   the change tracking program pod creates a snapshot content in response to the snapshot request and stops previous change tracking, and activates new change tracking and correspondingly stores the new change tracking to a new location of a volume in a cluster storage, the backup controller pod retrieves information of a current volume snapshot content and a location of a previous change log from the agent pod, the backup controller pod then creates another pod create request according to the information retrieved from the agent pod, the another pod create request specifies the volume snapshot content and the volume in the storage cluster to be mounted onto a backup pod to be created, and the second cluster allocates the volume snapshot content and the volume in the storage cluster to the backup pod and starts to run the backup pod.

8. The containerized application management system according to claim 7, wherein when there is the previous change log, the backup pod reads a change log of a persistent volume from an instructed volume location, and writes a changed block/file of a corresponding volume snapshot content into a backup target; and when there is no previous change log, the backup pod performs a complete backup of the volume snapshot content.

9. The containerized application management system according to claim 1, wherein the master node, the first worker node, and the second worker node are comprised in a cluster, the cluster further comprises a backup controller pod, and when the backup controller pod receives a backup request, the backup controller pod first communicates with the master node to generate a snapshot request, and the snapshot request is processed by a change tracking program pod corresponding to the pod, wherein
   the change tracking program pod creates a snapshot content in response to the snapshot request and stops previous change tracking, and activates new change tracking and correspondingly stores the new change tracking to a new location of a volume in a cluster storage, the backup controller pod retrieves information of a current volume snapshot content and a location of a previous change log from the master node, the backup controller pod then creates another pod create request according to the information retrieved from the master node, the another pod create request specifies the volume snapshot content and the volume in the storage cluster to be mounted onto a backup pod to be created, the cluster allocates the volume snapshot content and the volume in the storage cluster to the backup pod and starts to run the backup pod.

10. The containerized application management system according to claim 9, wherein when there is the previous change log, the backup pod reads a change log of a persistent volume from an instructed volume location, and writes a changed block/file of a corresponding volume snapshot content into a backup target; and when there is no previous change log, the backup pod performs a complete backup of the volume snapshot content.

11. A containerized application management method, applied to a network, a master node, a first worker nodes with a first change tracking program pod deployed thereon, and a second worker node with a second change tracking program pod deployed thereon, comprising:
receiving a pod create request, and sending a content mutate request by the master node when content of the pod create request meets a preset condition;
receiving the content mutate request and changing the content of the pod create request to form a mutated pod create request, and then forwarding the mutated pod create request by the master node to the first worker node or the second worker node; and
enabling the first worker node or the second worker node to create a pod according to the mutated pod create request, wherein the pod comprises an init container and at least one container, and after the init container is first executed to activate the first change tracking program pod or the second change tracking program pod, the container is executed, so that data changes generated when executing the container are recorded by the first change tracking program pod or the second change tracking program pod.

12. The containerized application management method according to claim 11, wherein the content of the pod create request meeting the preset condition is that the content of the pod create request matches a preconfigured webhook configuration.

13. The containerized application management method according to claim 11, wherein the init container is first executed to send a change tracking request to the first change tracking program pod or the second change tracking program pod, so as to activate a change tracking process in the first change tracking program pod or the second change tracking program pod.

14. The containerized application management method according to claim 11, wherein the master node, the first worker node, and the second worker node are comprised in a first cluster, the first cluster further comprises an agent pod, a second cluster is independent of the first cluster, the second cluster further comprises a backup controller pod, and when the backup controller pod receives a backup request, the backup controller pod first communicates with the agent pod to generate a snapshot request, and the snapshot request is processed by a change tracking program pod corresponding to the pod, wherein
the change tracking program pod creates a snapshot content in response to the snapshot request and stops previous change tracking, and activates new change tracking and correspondingly stores the new change tracking to a new location of a volume in a cluster storage, the backup controller pod retrieves information of a current volume snapshot content and a location of a previous change log from the agent pod, the backup controller pod then creates another pod create request according to the information retrieved from the agent pod, the another pod create request specifies the volume snapshot content and the volume in the storage cluster to be mounted onto a backup pod to be created, and the second cluster allocates the volume snapshot content and the volume in the storage cluster to the backup pod and starts to run the backup pod, wherein
when there is the previous change log, the backup pod reads a change log of a persistent volume from an instructed volume location, and writes a changed block/file of a corresponding volume snapshot content into a backup target; and when there is no previous change log, the backup pod performs a complete backup of the volume snapshot content.

15. The containerized application management method according to claim 11, wherein the master node, the first worker node, and the second worker node are comprised in a cluster, the cluster further comprises a backup controller pod, and when the backup controller pod of the cluster receives a backup request, the backup controller pod first communicates with the master node to generate a snapshot request, and the snapshot request is processed by a change tracking program pod corresponding to the pod, wherein
the change tracking program pod creates a snapshot content in response to the snapshot request and stops previous change tracking, and activates new change tracking and correspondingly stores the new change tracking to a new location of a volume in a cluster storage, the backup controller pod retrieves information of a current volume snapshot content and a location of a previous change log from the master node, the backup controller pod then creates another pod create request according to the information retrieved from the master node, the another pod create request specifies the volume snapshot content and the volume in the storage cluster to be mounted onto a backup pod to be created, the cluster allocates the volume snapshot content and the volume in the storage cluster to the backup pod and starts to run the backup pod, wherein
when there is the previous change log, the backup pod reads a change log of a persistent volume from an instructed volume location, and writes a changed block/file of a corresponding volume snapshot content into a backup target; and when there is no previous change log, the backup pod performs a complete backup of the volume snapshot content.

16. The containerized application management method according to claim 15, wherein the cluster is a k8s cluster.

* * * * *